Nov. 6, 1962   C. B. VOGEL ETAL   3,063,035
COUPLING FOR TRANSDUCERS IN A WELL-LOGGING DEVICE
Filed Dec. 26, 1957

INVENTORS:
CHARLES B. VOGEL
THOMAS W. LAMB
BY *James Todorovic*
THEIR ATTORNEY

United States Patent Office 3,063,035
Patented Nov. 6, 1962

3,063,035
COUPLING FOR TRANSDUCERS IN A
WELL-LOGGING DEVICE
Charles B. Vogel and Thomas W. Lamb, Houston, Tex., assignors to Shell Oil Company, New York, N.Y., a corporation of Delaware
Filed Dec. 26, 1957, Ser. No. 705,352
10 Claims. (Cl. 340—17)

This invention relates to seismic or acoustic well logging, and more particularly to a coupling member for maintaining (in a well-logging instrument) acoustic transducers adapted for measurement of acoustic properties of formations adjacent a well bore in a predetermined spaced-apart relationship without unwanted sound transmission through the coupling member. In one of its more specific embodiments, the invention pertains to a coupling member capable of maintaining annular, toroidally-wound, magnetostrictive transducers in a predetermined spaced-apart relationship while at the same time, avoiding unwanted electrical and sound transmission through the coupling member.

It is well known that the character and nature of various formations traversed during drilling of well bores, may be determined by the use of seismic or acoustic waves, these determinations being based on the fact that rock formations of different character transmit seismic waves at different velocities. These waves can be generated at one or more points in the bore hole and received by one or more receivers at a point or points above and/or below the point or points of wave generation. In usual practice of seismic or acoustic well logging, a well logging instrument containing one or more wave-generating and one or more wave-receiving transducers, together with the associated electrical elements for generating, detecting and transmitting the acoustic energy, is moved a well bore, which is filled with a liquid, e.g. water, mud or oil. The liquid in the bore-hole provides an effective acoustic coupling between the transducers and the surrounding formation; thus, the seismic or acoustic energy impulses or waves generated by a transmitting transducer is propagated through the liquid and into the walls of the bore hole in a direction generally normal to the axis of the borehole. Likewise, the impulses propagated through the rock create corresponding pressure waves which travel through this liquid to actuate the energy-receiving transducers. The waves or energy transmitted by a transducer do not only follow the above-defined path, i.e. normal to the axis of the bore: at least some of these impulses or waves travel more or less vertically, e.g. from the point of generation, through the borehole liquid, directly to the energy receiving transducer units. Since, in certain types of logging operations, these vertically propagated impulses confuse the record received by the receiving transducer or transducers, it is one of the objects of the present invention to provide a well-logging instrument which employs energy-transmitting and energy-receiving transducers which exhibit a preferentially directional response to horizontally travelling acoustic energies.

Since the well-logging device has to move up and down through the borehole, and since the device itself is a relatively long instrument, it is generally preferable, if not essential, that it be relatively flexible and thus adapted to curve around bends or obstructions within the borehole. The device should also be adapted to operate in a liquid which is under a relatively high pressure; it should also be preferably cylindrical in form and be of a relatively small diameter so as to be capable of passing through the various constrictions, such as the openings within valves, surface pipes, etc.

Although the well logging structure should, as stated, be flexible, it is highly desirable, and in most cases essential to have it constructed so that it is substantially inextensible. This is particularly true when the same well logging device or structure includes one or more transmitters and one or more receivers disposed above and/or below or on both sides of the transmitter or transmitters. In such cases, it is essential to maintain the distance between these transmitter(s) and receiver(s) as constant as possible, because any substantial variation in the distance between a given transmitter and a given receiver would distort the seismic records obtained because the time intervals between the start of impulses and their receipt will be influenced not only by the nature of the rock formations traversed, but also by the changes in the distance between the two transducers.

Various commonly-employed types of transducers are of such sizes and shapes that they may be readily mounted in or on a housing or support composed or consisting of rigid structural materials. The stress-bearing coupling member which connects or unites the transducers into a single well-logging device or unit, may consist of a strand or strands of rigid structural material, e.g. a metal chain, cable, rods, or the like, this coupling member being preferably disposed within, or being surrounded by, an elastic member. The transducers may then be attached to or disposed on this flexible member in the manner more fully described below. The insulated electric conductors which connect the transducers with the upper and lower portions of the logging device, such as instruments cases (to be described more fully below), and with the surface apparatuses, are usually disposed alongside or within the flexible elastic member. Since the flexible elastic member usually is a body of rubber or other natural or synthetic elastomers, the coupling member as a whole is normally a poor conductor of seismic or acoustic energy.

For various types of well logging operations, it becomes desirable to employ, both as wave-impulse transmitters and wave-impulse receiving units, annular, toroidally-wound, magnetostrictive transducers (hereinafter termed as "torus transducers") having an outer diameter near equal to that of the well-logging instrument itself. Such torus transducers have pronounced advantages in that they have a low impedance, a high efficiency, and a high degree of mechanical ruggedness, all of which properties are highly desirable. They also exhibit preferentially a directional response to horizontally travelling acoustic energy, i.e. energy travelling in a direction generally normal to the axis of the well-bore, as for example, the energy returning through the well liquid from a point of generation at the liquid-rock interface, this as distinguished from vertically travelling energy or impulses, e.g. those radiating substantially vertically through the borehole liquid from a point of their generation at points substantially below or above the energy-receiving transducer or transducers.

In addition to the above, the shape and dimensions of the torus transducers adapt them for use in an arrangement wherein the "stress member" (which may be defined as consisting of the stress-bearing coupling member and the elastic member surrounding it) is passed through the center of these torus transducers, so that, at all points, the stress member is located centrally or rather along the longitudinal axis of and within the frame elements of the well-logging device. This shields the stress member from contact with the walls of the borehole and thereby materially reduces the amount of vibrations which are set up or created within the metallic portions as the well-logging instrument is moved through the borehole. It also results in a structure in which the metallic portions which are located near the receiving transducers are so disposed that the incoming seismic or acoustic energy waves strike the energy-responsive surfaces of the receiving transducers sooner and with greater strength than these waves strike these metallic portions. This arrangement reduces the amount of ringing noise which normally appears in the receiver signal.

However, in practice, the latter advantage afforded by the torus transducers has heretofore been offset by the unique tendency of torus transducers to be affected or influenced by a different type of noise energy, which latter is probably caused by or is due to stray electrical energy which flows through the interior portions of the torus transducers.

The stress-bearing coupling members of the "stress members" are usually good electrical conductors; also, the electrical transmission lines, which are usually disposed in or immediately alongside these coupling members, are obviously excellent conductors of electricity. Although there is no intention of predicating the present invention, or any portion thereof, or any theory or theoretical interpretation of the observed phenomena, it is presently believed that, when electrically conductive paths extend from the vicinity of the interior of one torus transducer to or into the vicinity of the interior of another such torus transducer, or into contact with ground, currents tend to flow in response to stray electrical potentials of relatively high frequencies which latter are in the range of the frequencies of the energy used in seismic or acoustic velocity logging. Such stray electrical potentials are frequently encountered in the earth formations as well as in liquids in well bores.

As used herein, the term "noise energy" refers to any acoustic, mechanical, or electrical energy other than that provided by the seismic or acoustic impulses which are travelling through the surrounding earth formations. The term includes: spurious acoustic and mechanical energies created by the movements of the well-logging instrument within the borehole; energies which travel either through the well-logging instrument itself, or through the liquid in the borehole, instead of through the formations surrounding the well; energies generated by machinery, natural ground motion, wind action, and like disturbances in the vicinity of the well-bore; as well as any and all electrical energies from equipment near the well or coming from other units within the well-logging device. The transducers, employed to generate acoustic impulses within the borehole liquid, themselves often generate appreciable amounts of stray electrical energy.

It is one of the primary objects of the present invention to provide a well-logging device which avoids all of the above defects. It is another main object of the present invention to provide a well-logging device which is responsive to seismic or acoustic energy propagated through formations surrounding a borehole, which device is substantially free from undesirable noises, or at least is relatively immune to any such undesirable noise energies propagated or existing in the immediate vicinity of a well bore in which said well-logging device is being used. A further object is to provide coupling and holding means for maintaining annular, toroidally-wound magnetostrictive transducers in fixed position in or on the well-logging device and in predetermined and constant spaced-apart relationship to each other, and at the same time, materially reducing both the noise energy resulting from the movements of the well-logging device in the well-bore to be tested, and the noise energy caused by or due to the stray electrical potentials in or within the vicinity of the well-bore.

It has now been found that the above and other objects of the present invention may be attained by providing a well-logging apparatus which includes an elastic member carrying on its circumference at least a pair of annular, toroidally-wound, magnetostrictive transducers disposed in a definite spaced-apart relationship one above the other, this latter being effected by disposing, within the elastic member, a stress-bearing coupling member rigidly attached to the upper and lower rigid housing elements, this coupling member being connected in series with at least one electrical decoupling means disposed to inhibit the flow (through the coupling member) of fluctuating currents which normally are of frequencies employed in the well-logging operations. It has also been discovered that the ratio of the desirable signal to the undesirable noise in the transducer signals is materially affected by the presence of electrically conductive materials forming conductive paths extending through the interior of the torus transducers, and that the presence of such electrically conductive paths within the "stress members" can be avoided by separating the electricity-conducting portions of the coupling strands with electrical decoupling means, and also by disposing any and all electrical conductors which extend to and from the transducers in a manner such that they do not form a closed and electrically balanced loop on the outside circumference of the transducers.

When such electrically conductive paths are so avoided, the wave forms of the transducer signals are found to be particularly free from undesirable noises, and the signals obtained by a receiving transducer is found to be substantially identical with the wave forms of the impulse energy, e.g. energy wave transmitted by a transmitting transducer. On the other hand, where the transducers are disposed in a well-logging device and connected in a manner which is entirely comparable except that the electrically conductive paths, e.g. either the ordinary types of electrical transmission lines or the uninsulated portions of the metallic coupling members, or both, extend through the interior of one or more transducers, the signals in the receiving transducers are noise-induced modifications materially different from the wave forms of the impulse energy. The undesirable effects of electrically conductive paths extending through the interiors of the transducers can be avoided in respect to a pair of leads that are so positioned if the leads are balanced with respect to their potentials relative to ground and are not grounded at more than one point. However, it is generally preferable to dispose any leads not connected to a transducer on the outside circumference of the transducer.

It has also been found that a further and quite significant reduction in the ratio of the noise energy to the desired signal energy can be obtained by arranging or constructing the stress member so that there is a limited resiliency along all portions of the connection between the transducers. Such resiliency is, to some degree, obtained by mounting the transducers on bodies of resilient (elastic) material which surrounds and is attached to the tension-bearing coupling member. A still more effective amount of resiliency is obtained by the additional step of forming the coupling member of interconnected relatively short segments of rigid material, e.g. links of a chain, and separating each of the segments, e.g., links, one from the other, by providing elastic or resilient material arranged to act as buffers and electric decouplers between the otherwise contacting (and now merely contiguous) surfaces of adjacent segments or links.

The features of the invention which are considered to be novel and patentable will be pointed out in the claims appended hereto. For a better understanding of the invention, reference is now made to the following description and to the accompanying drawings in which:

Figure 1:
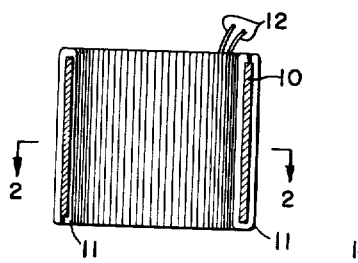
FIGURE 1 is a vertical cross-sectional view of a toroidally-wound annular magnetostrictive transducer, i.e. a torus transducer.
Figure 2:
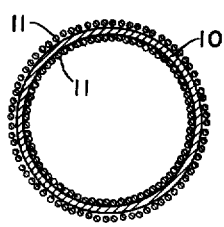
FIGURE 2 is a transverse cross-sectional view of the transducer taken along lines 2—2 of FIGURE 1.

Referring now to the drawings, FIGURES 1 and 2 thereof illustrate an embodiment of a torus transducer. As illustrated, the numeral 10 designates an elongated tubular element made of a metal or alloy capable of exhibiting magnetostrictive properties. The tubular element is constructed from a material capable not only of exhibiting magnetostrictive properties, but also of being permanently magnetized. While element 10 is illustrated as being circular in transverse cross section, it may, if desired, be rectilinear, polygonal or elliptic in cross section. Alternately, the element 10 may have a tubular section from which a narrow longitudinal section has been removed and replaced by a strip of permanently magnetizable metal or alloy.

Over the tubular element 10 is wound an electrically conducting coil 11 comprising a plurality of turns of insulated wire terminating in the leads 12. The turns of the coil 11 are preferably wound in the form of a ring or torus wholly encasing the tubular element 10.

Figure 3:
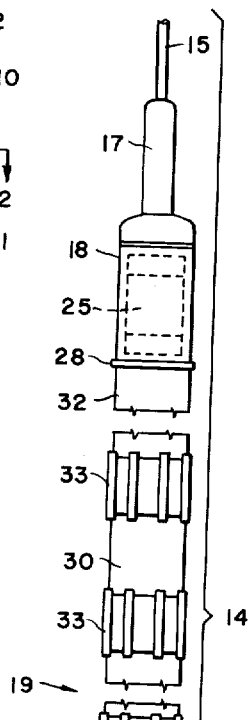
FIGURE 3 is a diagrammatic view of the well-logging tool of the present invention, which apparatus is adapted to be lowered into a well bore to effect seismic or acoustic well-logging therein.

Referring now to FIGURE 3, the illustrated apparatus is a somewhat oversimplified embodiment of the seismic or acoustic well-logging device capable of being lowered into a borehole and in which the seismic waves are transmitted and received by means of torus transducers which are mechanically and electrically connected into a single well-logging apparatus by a coupling member constructed in accordance with the present invention. This well-logging apparatus comprises an elongated tubular housing, generally designated by the numeral 14, adapted to be lowered into a borehole at the end of a cable 15. The housing 14 consists of a plurality of tubular members, preferably held in fluid-tight screw-threaded engagement with each other. These members may comprise an upper head conductor 17, through which mechanical and electrical connection is effected between housing 14 and the cable 15, an upper instrument case 18, a central portion generally indicated by numeral 19, a lower instrument case 20, and a bottom closure head 21. The upper and lower instrument cases are provided for the accomodation of auxiliary electric and electronic equipment necessary for the operation of the transmitters and the receivers, such as batteries, timing and relay switches, amplifiers, etc., diagrammatically indicated at 25 and 26. The circuits and component parts suitable for such electrical and electronic equipment may comprise, include or consist of known parts or devices generally similar to those described in the Vogel patent, U.S. 2,708,485.

The central portion 19 is connected to the upper and lower instrument cases 18 and 20 by means of rings 28 and 29, respectively. This central portion contains the pulse-generating transducer 30 and the pulse-receiving or detecting transducer 31, both of which are mounted (as described more fully below) on a connected unit 32 preferably of an elastic material. Where, as illustrated, the outer diameter of the transducers is substantially equal to the outer diameter of the rest of the well-logging apparatus, annular bumper rings 33 are preferably mounted above and below each transducer to prevent their contact with the borehole walls.

For purposes of simplifying the description, the well-logging apparatus shown in FIGURE 3 is illustrated as having only one transmitter and one receiver. However, in a preferred arrangement pairs of receiving transducers would be arranged in such a manner that these receiving transducers are disposed at known and fixed distances from each other and from the transmitting transducers.

Figure 4:
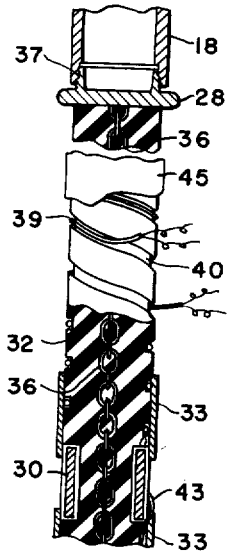
FIGURE 4 is an elevation, partially in section of a portion of a well-logging device illustrative of an embodiment of the present invention.

Referring now to FIGURE 4, the connecting unit 32 (which as previously stated, is of a flexible material, e.g. natural or synthetic rubber) surrounds a tension-bearing member (chain) 36, the upper and lower ends of which are fixedly attached to the rings 28 and 29, respectively. The ring 28 is, in turn, threaded attached to case 18 as at 37. The tension-bearing member 36 is normally constructed of metal or like rigid-structural material adapted to form a stress-bearing strand having a relatively small diameter in comparison to the outer diameter of the well-logging device. This stress member, i.e. the chain 36 of FIGURE 4, thus maintains a predetermined spaced-apart relationship between the two rings 28 and 29. Since the elastic, flexible material 32 in which the chain 36 is embedded, carries the transducers 30 and 31 on its periphery in annular grooves formed on the periphery of the cylinder of flexible material, the positions of these transducers are fixed with respect to each other and to the ends of the well-logging device. As in FIGURE 3, bumper rings 33 are provided above and below each of the transducers 30, 31. The provision of the flexible cylindrical element 32 and of the chain 36 permits flexibility (in the movement of the well-logging device around bends, etc. in the well bore) and, at the same time, maintenance of constant and fixed spaced-apart vertical relationship between the various transducers in said well-logging apparatus.

The electrical connections between the transducers 30 and 31 and the electric and electronic equipment 25 and 26 (contained in instrument cases 18 and 20, respectively) are effected by means of transmission line or cable 39 disposed in a spiral groove 40 on the periphery of elastic element 32. As indicated particularly in FIGURE 5, in the vicinity of each transducer, the electric wires 41 and 42 of the transmission line 39 are connected to the lead wires of coil 11 of the torus transducers 30 and 31. At the same time, the transmission lines which by-pass a given transducer are mounted so that they pass around the outside of said transducer, as indicated, for example, by numeral 43 of FIGURE 4. The transmission lines are preferably shielded from contact with the walls of the borehole, for example, by a protective sheath 45, which is preferably composed of natural rubber or a synthetic elastomer, or of layers of an insulating tape or fabric impregnated with a natural or synthetic elastomer. The protective sheath 45 is disposed over the outer cylindrical walls of element 32 so that it covers the transmission lines 39 in grooves 40. Such a protective sheath may also cover the transducers 30, 31, etc., and the transmission lines disposed on the outside of said transducers. However, as a general rule, it is preferred not to have the transducers, per se, covered by the above-described protective shield because the presence thereof on the transducers cuts down the amplitude of the signals transmitted or received by such transducers.

In a preferred construction of the well-logging apparatus of the present invention, the tension-bearing member 36 consists of a section of chain, which, as mentioned, is embedded in the rubber element 32 with the chain links arranged so that a space exists between the contact surfaces of at least some of the adjacent links. When the chain is so embedded, the rubber or synthetic elastomer fills the spaces between the link surfaces and each such unit segment of the chain is electrically decoupled by the presence of the insulating material between at least some of the adjacent surfaces of the unit. Also, in such places the presence of the elastomer provides additional resilience. The electric decoupling, together with the passage of the by-pass transmission lines on the outside of the torus transducers eliminates (or at least materially decreases) undesirable noises, and, at the same time improves the transmission and receipt of the desirable seismic or acoustic impulses.

Figure 5:
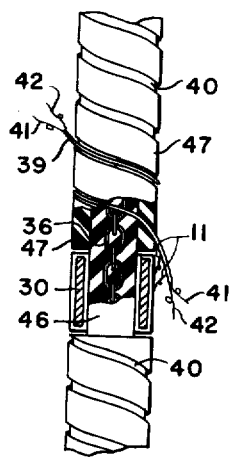
FIGURE 5 is an elevation, partially in section, showing a portion of another embodiment of the invention.

Referring to FIGURE 5, the amount of vibration associated with the movement of the apparatus in the borehole can be reduced by making the outer surface of the measuring unit substantially smooth. In such an arrangement, the tension-bearing coupling member, e.g. the chain 36 is surrounded by a cylindrical body 46 of an elastomeric material, on which are mounted the torus transducers, e.g. transducer 30. Annular sections or sleeves 47 of an elastomeric material are mounted around the cylindrical body 46 to extend along the portions thereof between the transducers and the instrument cases 18 and 20. The transmission lines 39 are preferably mounted in helical or spiral grooves 40 in the annular sleeves 47, and connected to the wirings of the torus transducers as described above, or are by-passed on their outer surfaces. If desired, the unit may be encased in a relatively thin protective sheath (not shown in FIGURE 5) of the type of sheath 45 of FIGURE 4.

Figure 6:
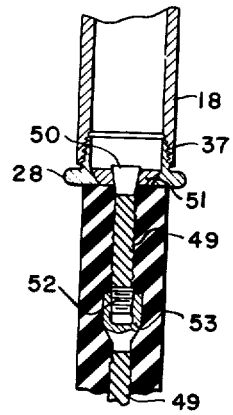
FIGURE 6 is an elevational section showing a portion of still another embodiment of the stress member constituting a part of the present invention.

FIGURE 6 represents the upper portion of a modified embodiment of the well-logging apparatus of the present invention. Therein, the upper instrument case 18 carries the upper ring 28 which, as in FIGURE 4, is threaded into case 18 as at 37. In this case, the tension-bearing member, instead of being in the form of a chain, consists of a plurality of metal cable segments 49 which are connected together by threaded connections which contain insulating means or bushings therein. As shown in the drawing, the upper metal cable segment 49 terminates at its upper end in a truncated cone or wedge-shaped anchor member 50 which sits in an annular ring 51 in ring 28, said annular ring 51 being made of or containing an insulating material which thus electrically decouples tension segment or member 49 from the rest of the metal parts above it. The lower end of each segment 49 is threaded by means 52 into a socket 53 at the upper end of the next tension-bearing member 49. This connection, if desired, may contain a bushing (not shown) which electrically decouples the two segments 49 from each other. The lower end of the lowermost segment is attached to ring 29 to maintain the spaced-apart relationship between the various transducers.

We claim as our invention:

1. In a well-logging apparatus which includes an elastic member carrying at least a pair of annular, toroidally-wound magnetostrictive transducers disposed in spaced-apart relationship one above the other, and electrical means for transmitting electric waves to and from said transducers, the improvement which comprises a tension-bearing coupling means within the elastic member, said tension-bearing means passing through the interiors of the transducers, thus maintaining the latter in fixed spaced-apart relationship, and at least one decoupling means connected in series with said tension-bearing coupling means to inhibit the flow of fluctuating currents having frequencies substantially in the range of frequencies employed in the well-logging operations.

2. In a well-logging apparatus which includes an upper rigid element, a lower rigid element, an elastic connecting member thereinbetween carrying at least a pair of annular, toroidally-wound magnetostrictive transducers disposed in spaced-apart relationship one above the other, and electrical means for transmitting electric waves to and from said transducers, the improvement which comprises a tension-bearing coupling means within the elastic member, said coupling means being fixedly attached to the upper and lower rigid elements and passing through the annuli of the transducers, thus maintaining the latter in fixed spaced-apart relationship, and electrical decoupling means associated in series with the coupling means to inhibit the flow of fluctuating currents having frequencies substantially in the range of frequencies employed in the well-logging operations.

3. In a well-logging apparatus which includes an upper rigid element, a lower rigid element, an elastic connecting member thereinbetween carrying at least a pair of annular, toroidally-wound magnetostrictive transducers disposed in spaced-apart relationship one above the other, and electrical means for transmitting electric waves to and from said transducers, the improvement which comprises a tension-bearing coupling means within the elastic member, said coupling means being fixedly attached to the upper and lower rigid elements and passing through the annuli of the transducers, thus maintaining the latter in fixed spaced-apart relationship, electrical decoupling means associated in series with the coupling means to inhibit the flow of fluctuating currents having frequencies substantially in the range of frequencies employed in the well-logging operations, and electrical transducers by-passing means connected to the aforesaid electrical means, whereby each electrical transmission line which by-passes a given transducer passes around the outside thereof.

4. The well-logging apparatus of claim 3 wherein the tension-bearing coupling means comprises a plurality of interconnected metal segments.

5. The well-logging appartus of claim 3 wherein the tension-bearing coupling means comprises a plurality of interconnected metal segments, at least some of which are provided with insulating means to effect electrical decoupling within the tension-bearing coupling means.

6. The well-logging apparatus of claim 3 wherein the tension-bearing coupling means comprises a metal chain, and wherein the electrical decoupling means comprises elastomeric material disposed between the contacting surfaces of at least two adjacent links of said chain.

7. In a well-logging apparatus, which includes an upper rigid element, a lower rigid element, an elastic member extending thereinbetween, a plurality of annular, toroidally-wound, magnetostrictive transducers disposed one above the other substantially on the periphery of said elastic member and in spaced-apart relationship to each other and to the upper and lower rigid elements, and electrical means for transmitting electrical impulses to and from said transducers, the improvement which comprises a tension-bearing coupling member disposed within the elastic member, said coupling member being fixedly attached to the upper and lower housing elements and passing through the annuli of the transducers, thereby maintaining the latter in the aforesaid fixed spaced-apart relationship, electrical decoupling means associated in series with said coupling means to inhibit flow therethrough of fluctuating currents having frequencies substantially in the range of frequencies employed in the well-logging operations, electrical means connecting the transducers with the electrical transmitting means, and electrical transducer-bypassing means connected to the first-mentioned electrical transmitting means, whereby each electric transmission line which bypasses a given transducer passes around the outside of the annulus thereof.

8. A well-logging apparatus comprising: a plurality of annular acoustical transducers disposed in spaced relationship; circuit means for transmitting electrical signals to and from said transducers; coupling means including an elastic outer member passing through said transducers, said transducers being mounted on said elastic member; said coupling means including a tension member for maintaining said transducers in said spaced relationship under a tension force and electrical decoupling means in series with said tension member for limiting the direct flow of electrical energy through said tension member.

9. In a well-logging apparatus including a plurality of tubular acoustical transducers, a coupling means for maintaining the transducers in a spaced relationship comprising: a solid resilient member, the transducers being disposed on said resilient member; a tension bearing member within said resilient member; circuit means for transmitting electrical signals to and from said transducers and at least one decoupling means connected in series with said tension bearing member for electrically decoupling said tension-bearing member.

10. A well logging apparatus comprising: a plurality of spaced transducers disposed in spaced relationship; circuit means for transmitting signals to and from said transducers; coupling means including an outer member, said transducers being mounted on said outer member; a tension member disposed within said outer member for maintaining said transducers in said spaced relationship under a tension force and electrical decoupling means in series with said tension member for electrically decoupling said tension member.

References Cited in the file of this patent

UNITED STATES PATENTS

| | | |
|---|---|---|
| 2,216,600 | Moore | Oct. 1, 1940 |
| 2,622,125 | Bender | Dec. 16, 1952 |
| 2,681,442 | Schurman | June 15, 1954 |
| 2,708,485 | Vogel | May 17, 1955 |
| 2,762,032 | Vogel | Sept. 4, 1956 |
| 2,807,793 | Bayhi | Sept. 24, 1957 |
| 2,856,594 | McLoad | Oct. 14, 1958 |
| 2,864,073 | Harris | Dec. 9, 1958 |
| 2,897,478 | Summers | July 28, 1959 |